(12) United States Patent
Ikeda et al.

(10) Patent No.: US 9,956,859 B2
(45) Date of Patent: May 1, 2018

(54) VEHICLE BATTERY MOUNTING STRUCTURE

(71) Applicant: TOYOTA JIDOSHA KABUSHIKI KAISHA, Toyota-shi, Aichi-ken (JP)

(72) Inventors: Koki Ikeda, Toyota (JP); Kiyoshi Hokazono, Toyota (JP); Shinya Kamimura, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 14/566,269

(22) Filed: Dec. 10, 2014

(65) Prior Publication Data

US 2015/0174996 A1  Jun. 25, 2015

(30) Foreign Application Priority Data

Dec. 25, 2013 (JP) ................................. 2013-267962

(51) Int. Cl.
| | |
|---|---|
| *B60K 1/04* | (2006.01) |
| *H01M 2/10* | (2006.01) |
| *H01M 8/2465* | (2016.01) |
| *H01M 16/00* | (2006.01) |

(52) U.S. Cl.
CPC ............ *B60K 1/04* (2013.01); *H01M 2/1083* (2013.01); *H01M 8/2465* (2013.01); *B60K 2001/0438* (2013.01); *B60Y 2306/01* (2013.01); *H01M 16/003* (2013.01); *H01M 2250/20* (2013.01); *Y02T 90/32* (2013.01)

(58) Field of Classification Search
CPC ............ B60K 1/04; B60K 2001/0433; B60K 2001/0438; B60K 2001/0455; B60L 11/1877; B62D 21/155; B62D 25/20; B60Y 2306/01
See application file for complete search history.

(56) References Cited

U.S. PATENT DOCUMENTS

| | | | | |
|---|---|---|---|---|
| 5,886,501 | A * | 3/1999 | Marks et al. ................. | 320/112 |
| 6,188,574 | B1 * | 2/2001 | Anazawa ................. | B60K 1/04 |
| | | | | 180/68.5 |
| 6,227,322 | B1 * | 5/2001 | Nishikawa .................... | 180/68.5 |
| 7,824,797 | B2 * | 11/2010 | Nishino et al. ............... | 429/163 |

(Continued)

FOREIGN PATENT DOCUMENTS

JP  B2-4924684  4/2012

*Primary Examiner* — Emma K Frick
(74) *Attorney, Agent, or Firm* — Oliff PLC (57) ABSTRACT

A vehicle battery mounting structure includes a battery frame that is disposed at a vehicle lower side of a floor panel, and is made from resin; a ductile member that includes a main body joined to the battery frame and a flange contiguously formed at a vehicle width direction outside end of the main body, the flange having a hole, and the ductile member being fastened to a lower face of the floor panel using a fastener inserted through the hole; and a fastening portion that is formed in a region including the hole, having a substantially hat shaped cross-section profile projecting toward a vehicle upper side and having ridge lines on vehicle front-rear direction sides of the region, and the ridge lines being formed with curved or bent shape toward directions heading away from the hole on progression toward a vehicle width direction inside in plan view.

8 Claims, 7 Drawing Sheets

(56) References Cited

U.S. PATENT DOCUMENTS

| | | | |
|---|---|---|---|
| 7,926,602 B2* | 4/2011 | Takasaki | 180/68.5 |
| 7,997,368 B2* | 8/2011 | Takasaki et al. | 180/68.5 |
| 8,051,934 B2* | 11/2011 | Kiya | B60K 1/04 |
| | | | 180/274 |
| 8,464,817 B2* | 6/2013 | Usami | B60K 1/04 |
| | | | 180/68.5 |
| 8,689,919 B2* | 4/2014 | Maeda et al. | 180/68.5 |
| 8,708,402 B2* | 4/2014 | Saeki | 296/187.12 |
| 8,728,648 B2* | 5/2014 | Choo et al. | 429/100 |
| 8,833,839 B2* | 9/2014 | Young et al. | 296/187.12 |
| 8,835,033 B2* | 9/2014 | Choi | B29C 70/20 |
| | | | 180/68.5 |
| 8,859,126 B2* | 10/2014 | Yamada | B60K 1/04 |
| | | | 429/100 |
| 8,900,744 B2* | 12/2014 | Loo et al. | 429/172 |
| 8,936,125 B2* | 1/2015 | Nakamori | 180/68.5 |
| 8,967,312 B2* | 3/2015 | Yanagi | 180/68.5 |
| 8,980,458 B2* | 3/2015 | Honjo et al. | 429/100 |
| 9,054,360 B2* | 6/2015 | Yi | B60K 1/04 |
| 2012/0129029 A1* | 5/2012 | Yi et al. | 429/100 |
| 2012/0156539 A1* | 6/2012 | Honjo | B60K 1/04 |
| | | | 429/100 |
| 2012/0251862 A1* | 10/2012 | Kano | B60K 1/04 |
| | | | 429/99 |
| 2012/0301765 A1* | 11/2012 | Loo et al. | 429/100 |
| 2012/0321927 A1* | 12/2012 | Loo et al. | 429/100 |
| 2013/0202936 A1* | 8/2013 | Kosaki et al. | 429/99 |
| 2014/0015238 A1* | 1/2014 | Juettner et al. | 280/785 |
| 2014/0017538 A1* | 1/2014 | Nakamori | H01M 2/1077 |
| | | | 429/99 |
| 2014/0060944 A1* | 3/2014 | Fillion et al. | 180/65.31 |
| 2014/0158444 A1* | 6/2014 | Han | H01M 2/1083 |
| | | | 180/68.5 |
| 2014/0166381 A1* | 6/2014 | Ling | B60K 1/04 |
| | | | 180/68.5 |
| 2014/0246259 A1* | 9/2014 | Yamamura et al. | 180/68.5 |
| 2014/0284125 A1* | 9/2014 | Katayama | B60K 1/04 |
| | | | 180/68.5 |
| 2014/0291046 A1* | 10/2014 | Araki | B60K 1/04 |
| | | | 180/68.5 |
| 2014/0315064 A1* | 10/2014 | Katayama et al. | 429/120 |

* cited by examiner

VEHICLE BATTERY MOUNTING STRUCTURE

CROSS-REFERENCE TO RELATED APPLICATION

This application is based on and claims priority under 35 USC 119 from Japanese Patent Application No. 2013-267962 filed on Dec. 25, 2013, the disclosure of which is incorporated by reference herein.

BACKGROUND

1. Technical Field

The present invention relates to a vehicle battery mounting structure.

2. Related Art

A structure has been known in which battery frames for housing a drive battery that is disposed below the floor of an electric vehicle are formed from fiber reinforced plastic (FRP), and are fixed to side frames (under members) disposed on the left and right at a lower face of the floor (see, for example, Japanese Patent No. 4924684).

However, in resin battery frames, there is a concern of damage to fixing portions of the battery frame to the under members (floor side) due to collision load input when the vehicle experiences a side collision. There is accordingly a room for improvement in structures to prevent damage to fixing portions of the resin battery frame to the floor, in the event of a vehicle side collision.

SUMMARY

The present invention provides a vehicle battery mounting structure capable of preventing damage to fixing portions of a resin battery frame to a floor in the event of a vehicle side collision.

One aspect of the present invention is a vehicle battery mounting structure including: a battery frame that is disposed at a vehicle lower side of a floor panel, supports a battery, and is made from resin; a ductile member that includes a main body joined to the battery frame and a flange contiguously formed at a vehicle width direction outside end portion of the main body, the flange having a hole, and the ductile member being fastened and fixed to a lower face of the floor panel using a fastener inserted through the hole of the flange; and a fastening portion that is formed in a region including the hole of the flange, the region having a substantially hat shaped cross-section profile projecting toward a vehicle upper side and the region having ridge lines on vehicle front-rear direction sides of the region, and the ridge lines being formed with curved or bent shape toward directions heading away from the hole on progression toward a vehicle width direction inside in plan view.

According to the present aspect, the region including the hole formed at the flange of the ductile member configures the fastening portion formed with a substantially hat shaped cross-section profile projecting toward the vehicle upper side. The ridge lines at the vehicle front-rear direction sides of the region of the fastening portion are formed so as to curve or bend toward directions heading away from the hole on progression toward the vehicle width direction inside in plan view.

Accordingly, in the event of a side collision of the vehicle, collision load input to the flange of the ductile member through the fastener is distributed in directions heading away from the hole, namely in the vehicle front-rear direction, along the curving or bending ridge lines. Accordingly, in the event of a side collision of the vehicle, damage to the flange that is a location on the resin battery frame side for fixing to a floor side is suppressed or prevented.

The present aspect may be configured such that the curved or bent shape of the ridge lines of the fastening portion is formed at a position intersecting with a hypothetical tangent to a vehicle width direction inside edge of the hole in plan view.

According to the above configuration, the curved or bent shape of the ridge lines of the fastening portion is formed at a position intersecting with a hypothetical tangent at the vehicle width direction inside edge of the hole in plan view. Surface rigidity of the fastening portion is accordingly secured, and collision load input to the flange through the fastener in the event of a side collision of the vehicle is efficiently distributed in the vehicle front-rear direction along the ridge lines. Accordingly, in the event of a side collision of the vehicle, damage to the flange that is a location on the resin battery frame side for fixing to the floor side is further suppressed or prevented.

The present aspect may be configured such that a vehicle width direction outside end portion of the curved or bent shape of the ridge lines of the fastening portion is formed further inside in the vehicle width direction than a hypothetical tangent to a vehicle width direction outside edge of the hole in plan view.

According to the above configuration, the vehicle width direction outside end portion of the curved or bent shape of the ridge line of the fastening portion is formed further inside in the vehicle width direction than a hypothetical tangent to the vehicle width direction outside edge of the hole in plan view. Surface rigidity of the fastening portion is accordingly secured, and collision load input to the flange through the fastener in the event of a side collision of the vehicle is efficiently distributed in the vehicle front-rear direction along the ridge lines. Accordingly, in the event of a side collision of the vehicle, damage to the flange that is a location on the resin battery frame side for fixing to the floor side is further suppressed or prevented.

The present aspect may be configured such that a vehicle width direction outside end portion of the curved or bent shape of the ridge lines of the fastening portion is formed further inside in the vehicle width direction than a hypothetical straight line running in the vehicle front-rear direction and passing through a center of the hole in plan view.

According to the above configuration, the vehicle width direction outside end portion of the curved or bent shape of the ridge line of the fastening portion is formed further to the vehicle width direction inside than a hypothetical straight line running in the vehicle front-rear direction to pass through the center of the hole in plan view. Surface rigidity of the fastening portion is accordingly increased, and collision load input to the flange through the fastener in the event of a side collision of the vehicle is even more efficiently distributed in the vehicle front-rear direction along the ridge lines. Accordingly, in the event of a side collision of the vehicle, damage to the flange that is a location on the resin battery frame side for fixing to the floor side is further suppressed or prevented.

BRIEF DESCRIPTION OF THE DRAWINGS

Exemplary embodiments of the present invention will be described in detail based on the following figures, wherein.

DETAILED DESCRIPTION

Detailed explanation follows regarding an exemplary embodiment, with reference to the drawings. To aid explanation, in each of the drawings, the arrow UP indicates the vehicle upward direction, the arrow FR indicates the vehicle front direction, and the arrow IN indicates the vehicle width direction inside. Unless specifically indicated otherwise, where employed in the following explanation, the up and down, front and rear, and left and right directions indicate up and down in the vehicle up-down direction, front and rear in the vehicle front-rear direction, and left and right in the vehicle left-right direction (vehicle width direction). The left side of a vehicle body is illustrated in each of the drawings; however, since the right side of the vehicle body is configured similarly but with left-right symmetry, explanation regarding the right side of the vehicle body is omitted.

Figure 1:
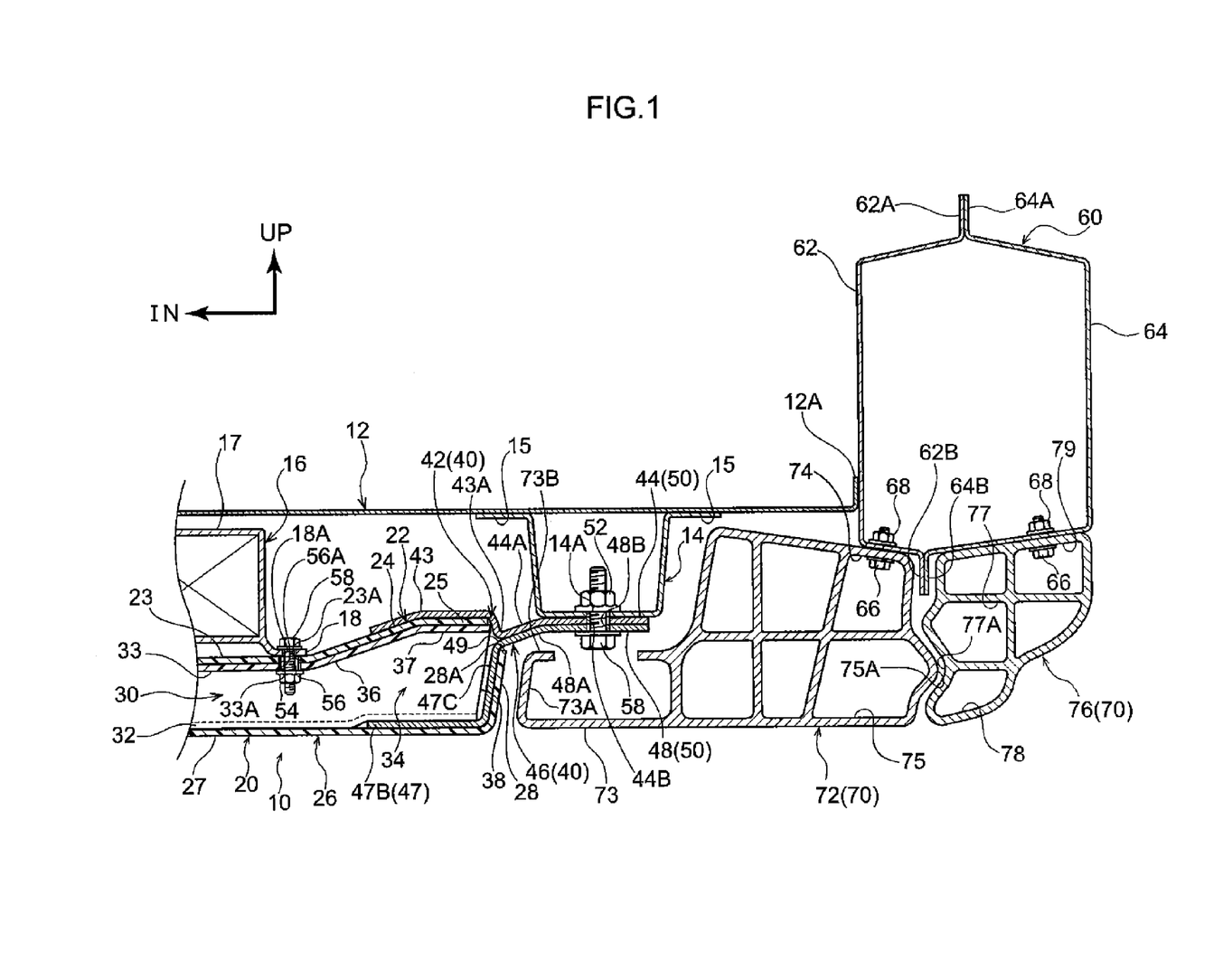
FIG. 1 is a front cross-sectional view illustrating a vehicle battery mounting structure according to an exemplary embodiment.

As illustrated in FIG. 1, a pair of left and right under members (side frames) 14, included in a vehicle frame structure and extending in the vehicle front-rear direction, are joined to a lower face of a metal floor panel 12 of a vehicle floor section. The under members 14 are formed from metal with a substantially hat shaped cross-section profile, and flange portions 15 thereof projecting out in the vehicle width directions are respectively joined and fixed to the lower face of both vehicle width direction end portions of the floor panel 12 by welding or the like.

Plural through holes 14A, through which flange bolts 58, described later, are inserted, are formed at the under members 14 along the length direction (vehicle front-rear direction) thereof. Weld nuts 52 are provided coaxially to each of the through holes 14A at upper faces of the under members 14.

A vehicle battery mounting structure 10 according to the present exemplary embodiment, applied to a vehicle such as an electric car, is disposed at the vehicle lower side of the floor panel 12, and includes a battery frame (stack frame) 20 that supports a fuel cell stack 16, serving as a battery, from the vehicle lower side. The battery frame 20 is made from fiber reinforced plastic (FRP), for example, carbon fiber reinforced plastic (CFRP).

An outer case portion 17 of the fuel cell stack 16 is formed from metal (or resin) in a rectangular box shape, and legs 18 that project out toward the vehicle width direction outsides are integrally formed at plural specific positions at a lower end peripheral edge portion of the outer case portion 17. Each of the legs 18 is formed with a through hole 18A through which respective flange bolts 58, described later, are inserted.

Figure 2:
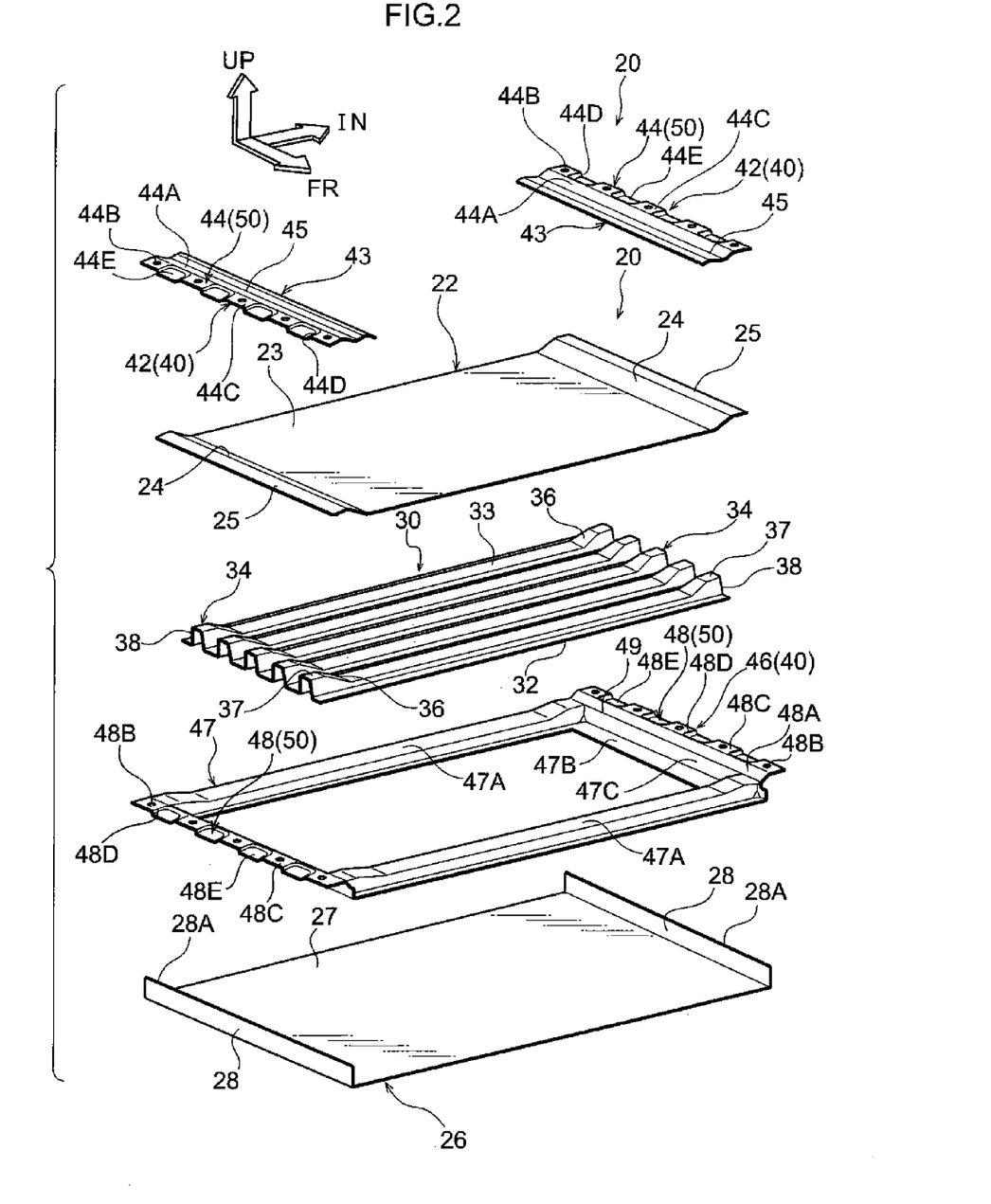
FIG. 2 is an exploded perspective view illustrating a battery frame and a ductile member included in the vehicle battery mounting structure according to the present exemplary embodiment.

As illustrated in FIG. 1 and FIG. 2, the battery frame 20 includes an upper frame 22 serving as an upper battery frame, a lower frame 26 serving as a lower battery frame, and a core frame 30 serving as an intermediate member (reinforcement member), provided between the upper frame 22 and the lower frame 26.

The upper frame 22 includes: a rectangular, flat-plate shaped top plate 23 disposed along the horizontal direction; rectangular, flat-plate shaped inclined walls 24 that incline upwards toward the vehicle width direction outsides, integrally provided contiguous to both vehicle width direction end portions (outside end portions) of the top plate 23 so as to follow inclined walls 36, described later; and rectangular, flat-plate shaped flanges 25 that extend substantially horizontally toward the vehicle width direction outsides, integrally provided contiguous to both vehicle width direction outside end portions of the inclined walls 24 so as to follow upper walls 37, described later.

The lower frame 26 includes a rectangular, flat-plate shaped bottom plate 27 disposed along the horizontal direction, and rectangular, flat-plate shaped side walls 28 projecting up substantially vertically toward the vehicle upper side, more specifically at a slight incline toward the vehicle upper outsides as viewed along the vehicle front-rear direction, and integrally provided contiguous to both vehicle width direction end portions (outside end portions) of the bottom plate 27.

The height of the side walls 28 is set at a height almost reaching (extending to) a boundary 49 between a side wall 47C of a lower main body 47 of a lower ductile member 46 and a lower flange 48 of the lower ductile member 46, described later, when the lower ductile member 46 is joined to the lower frame 26. In other words, the upper end face 28A of each side wall 28 is positioned at substantially the same height as an upper end face 73B of a block portion 73 of an inner member 72 of an energy absorption portion 70, described later.

As illustrated in FIG. 2, the core frame 30 includes: a main body 32 formed with projections 33, each having a substantially hat shaped cross-section profile extending along the vehicle width direction, which are arranged in plural rows (for example five rows) in the vehicle front-rear direction; and protrusions 34, formed at both vehicle width direction end portions of the main body 32 so as to protrude toward the vehicle upper side contiguous to upper faces of the projections 33.

Inclined walls 36, inclining upwards toward the vehicle width direction outsides from the upper faces of the projections 33, are integrally provided contiguous to vehicle width direction insides of the protrusions 34. Substantially horizontal upper walls 37 are integrally provided extending toward the vehicle width direction outsides, contiguous to upper end portions of the inclined walls 36. End faces 38 that make a cross-section profile substantially perpendicular to the main body 32 are configured at vehicle width direction outside end portions of the protrusions 34. Namely, the protrusions 34 are formed in substantially trapezoidal shapes as viewed along the vehicle front-rear direction (as viewed from the front).

The upper faces of each of the projections 33 of the core frame 30 are joined to a lower face of the top plate 23 of the upper frame 22 using an adhesive. The lower face of the main body 32 of the core frame 30 is joined to an upper face of the bottom plate 27 of the lower frame 26 using an adhesive. The battery frame 20 is thus substantially configured with a rectangular closed cross-section profile.

As illustrated in FIG. 1, through holes 23A, 33A are respectively formed in mutual communication with each other at plural specific positions of the top plate 23 of the upper frame 22 and the projections 33 of the core frame 30. Flange nuts 54 are joined to lower faces of the projections 33, coaxially to each of the through holes 23A, 33A, using an adhesive. Metal, circular cylinder shaped collar members 56 are integrally and coaxially provided to upper faces of each of the flange nuts 54, and the respective collar members 56 are inserted into the respective through holes 23A, 33A.

Thus, the fuel cell stack 16 is fastened and fixed to the battery frame 20 (to the upper frame 22 and the core frame 30) by placing the fuel cell stack 16 on the upper face of the upper frame 22 (top plate 23) such that the through holes 18A of the legs 18 are in communication with through holes 56A of the collar members 56, inserting the flange bolts 58 through the through holes 18A and the through holes 56A from the vehicle upper side and being screwed into the flange nuts 54.

As illustrated in FIG. 1 and FIG. 2, upper main bodies 43 of a pair of left and right upper ductile members 42, configuring an upper side of a ductile member 40, are respectively joined to upper faces of the inclined walls 24 and the flanges 25 of the upper frame 22. More specifically, the length direction of the upper ductile members 42 is set along the vehicle front-rear direction, and lower faces of the upper main bodies 43, which are vehicle width direction inside portions thereof, are joined to the upper faces of the inclined walls 24 and the flanges 25 of the upper frame 22 using an adhesive.

Upper flanges 44 (which are vehicle width direction outside end portions of the upper ductile members 42) protruding toward the vehicle width direction outside of the flanges 25 of the upper frame 22 and the end faces 38 of the core frame 30 (battery frame 20) are integrally provided contiguous to vehicle width direction outside end portions of the upper main bodies 43.

Figure 3:
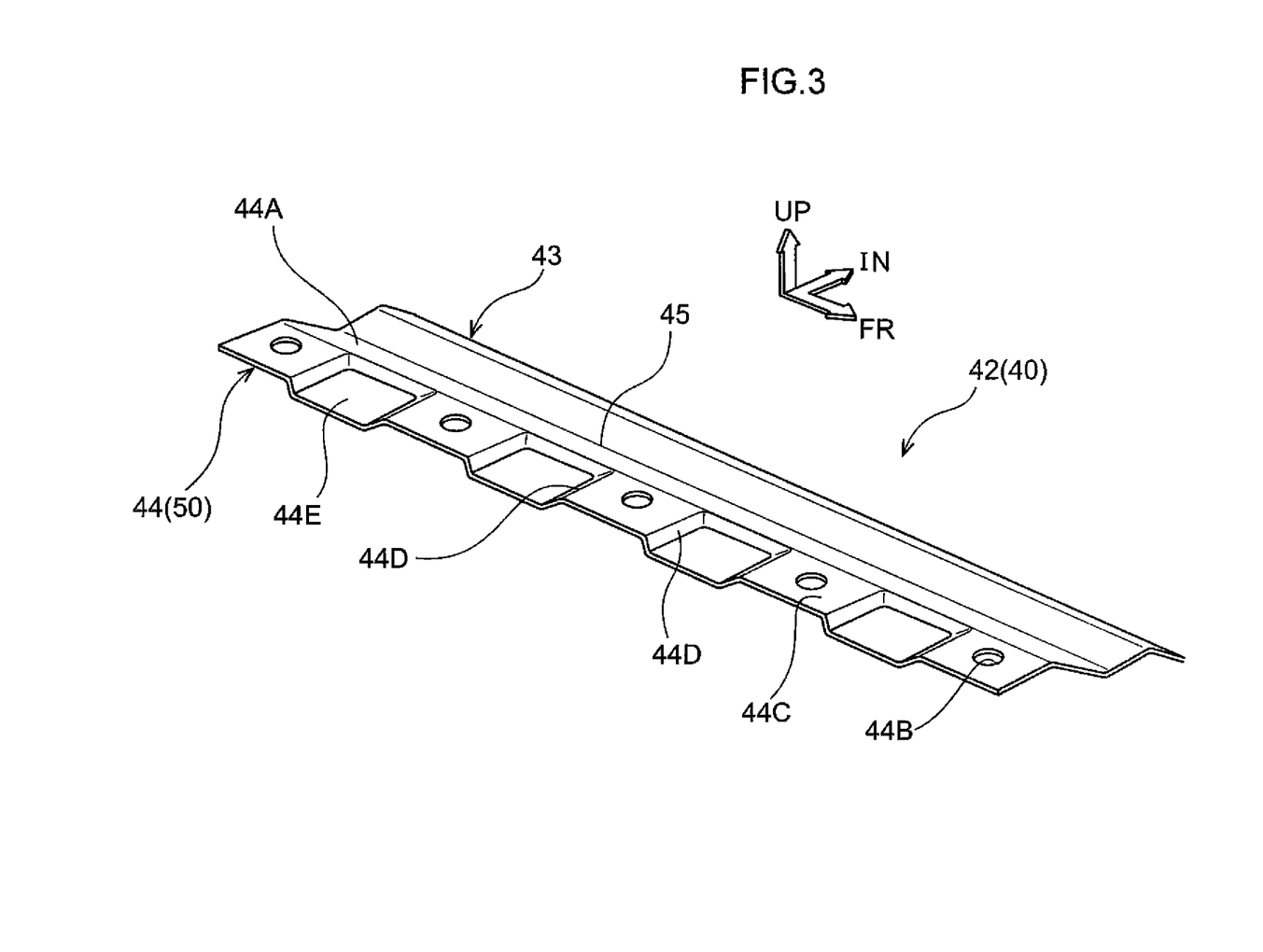
FIG. 3 is a perspective view illustrating an upper ductile member included in the vehicle battery mounting structure according to the present exemplary embodiment.

As illustrated in FIG. 2 and FIG. 3, plural holes 44B, through which the flange bolts 58 (see FIG. 1) serving as fasteners are inserted, are formed through the upper flanges 44 at specific intervals along the vehicle front-rear direction. More specifically, respective substantially rectangular indented shapes are formed between the respective holes 44B of the upper flanges 44, such that plural (for example, five) regions centered on the respective holes 44B form substantially rectangular, relative projection shapes (substantially hat shaped cross-section profiles projecting toward the vehicle upper side). Each of these regions (projections) respectively serves as a fastening portion 44C.

Figure 4:
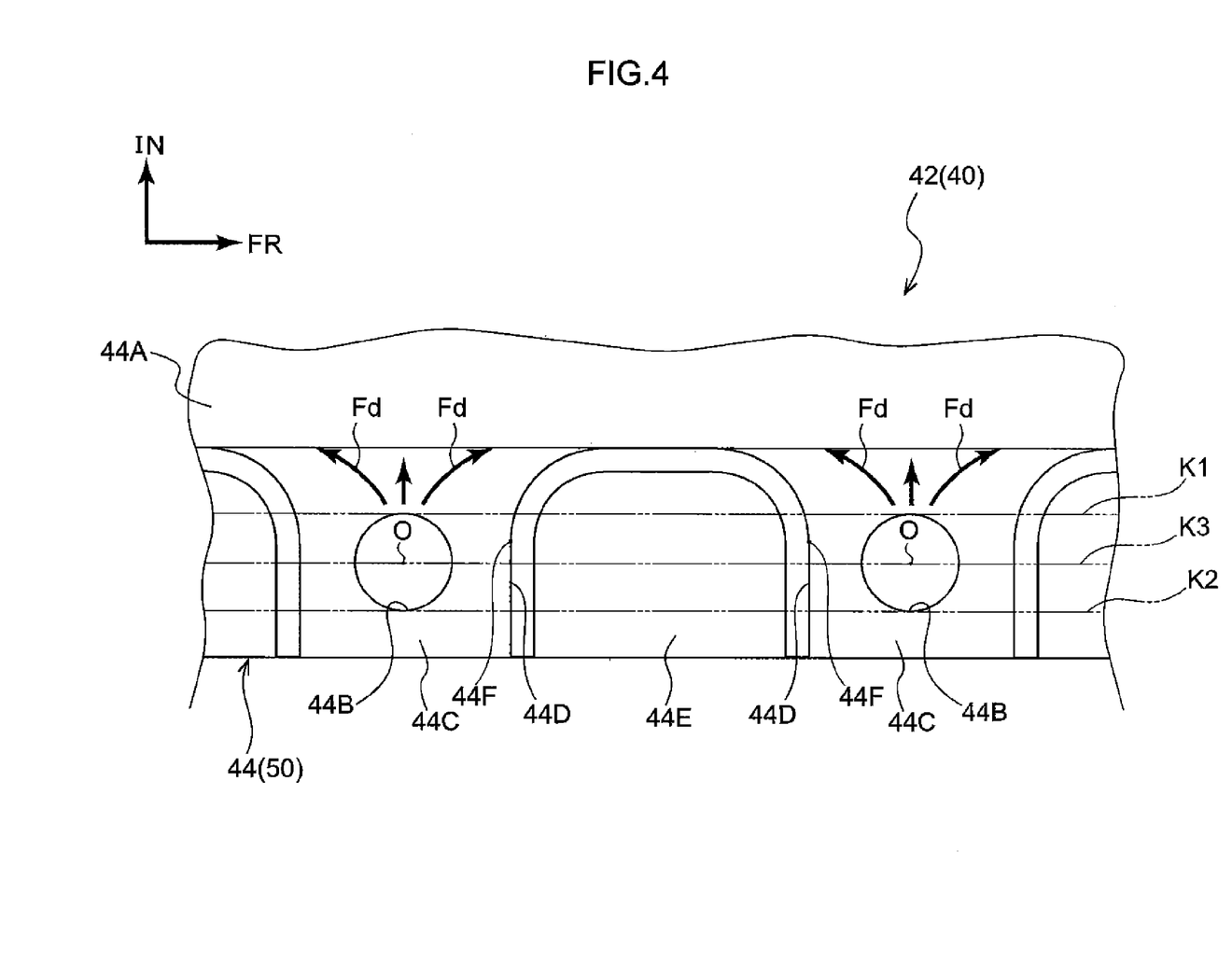
FIG. 4 is an enlarged plan view illustrating a portion of the upper ductile member included in the vehicle battery mounting structure according to the present exemplary embodiment.

As illustrated in FIG. 4, in plan view, ridge lines 44D on the vehicle front-rear direction sides of the respective fastening portions 44C are formed with straight line shapes from vehicle width direction outside end portions toward the vehicle width direction inside, and are formed with curved shapes (shapes that curve around toward the vehicle front-rear direction) that curve in a circular arc shape in directions gradually turning away from the holes 44B on progression toward the vehicle width direction inside.

Namely, vehicle width direction inside end portions of the curved shapes of the ridge lines 44D of the respective fastening portions 44C respectively extend in the vehicle front-rear direction in plan view, mutually connecting together adjacent ridge lines 44D. Substantially rectangular shaped indentations 44E are accordingly formed between each of the holes 44B, achieving a configuration in which collision load is distributed more efficiently than with a shape in which adjacent ridge lines 44D are not mutually connected together.

Moreover, in plan view, the curved shapes of the ridge lines 44D of the respective fastening portions 44C are formed at a position intersecting a hypothetical tangent K1 at the vehicle width direction inside edges of the holes 44B. A configuration is accordingly achieved in which collision load input to the upper flanges 44 by the flange bolts 58 is efficiently distributed in the vehicle front-rear direction along the respective ridge lines 44D (i.e., concentration of stress toward vehicle width direction inside edges of the holes 44B is prevented).

Moreover, in plan view, vehicle width direction outside end portions (boundary portions between the curved portions and the straight line portions) 44F of the curved shapes of the ridge lines 44D of the fastening portions 44C are formed further to the vehicle width direction inside than a hypothetical tangent K2 to the vehicle width direction outside edges of the holes 44B. A configuration is accordingly achieved in which the surface rigidity (strength as a coupling seat face) of the respective fastening portions 44C is secured or increased.

Note that the vehicle width direction outside end portions 44F of the curved shapes of the ridge lines 44D of the respective fastening portions 44C are preferably formed further to the vehicle width direction inside than a hypothetical straight line K3 running in the vehicle front-rear direction to pass through the centers O of the holes 44B. The surface rigidity (strength as a coupling seat face) of the respective fastening portions 44C is accordingly further secured or increased.

Figure 5:
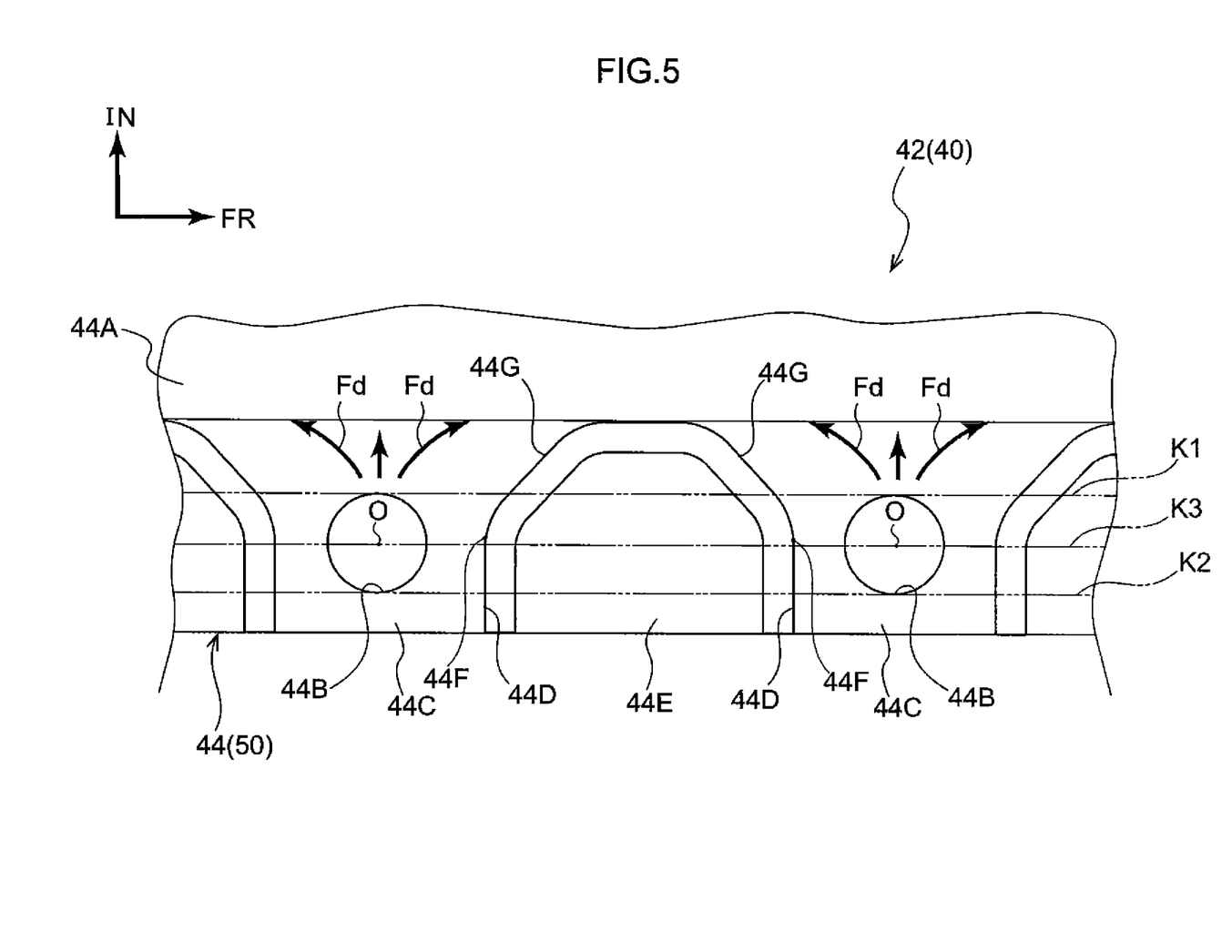
FIG. 5 is an enlarged plan view illustrating a portion of another upper ductile member included in the vehicle battery mounting structure according to the present exemplary embodiment.

As illustrated in FIG. 5, the ridge lines 44D at the vehicle front-rear direction sides of the respective fastening portions 44C may be formed with straight line shapes from the vehicle width direction outside end portions toward the vehicle width direction inside in plan view, and formed with bent shapes that change direction incrementally at angled portions 44G toward directions turning away from the holes 44B on progression toward the vehicle width direction inside (shapes that curve around toward the vehicle front-rear direction). Note that there is no limitation to a single angled portion 44G, and plural angled portions 44G may be formed gradually turning away from the holes 44B.

The lower main body 47 of the lower ductile member 46 that forms the lower side of the ductile member 40 is joined to the upper face of the bottom plate 27 of the lower frame 26. More specifically, the lower ductile member 46 includes the rectangular frame shaped lower main body 47, and the lower faces of the lower main body 47 (including lips 47B) are joined to the upper face of the bottom plate 27 of the lower frame 26 using an adhesive.

The core frame 30 is accordingly disposed inside the lower main body 47, and in this state, the lower face of the main body 32 is joined to the upper face of the bottom plate 27 of the lower frame 26 using an adhesive. Both vehicle front-rear direction end portions of the lower main body 47 are configured with projections 47A with substantially hat shaped cross-section profiles extending along the vehicle width direction. Upper faces of the projections 47A are joined to the lower face of the top plate 23 of the upper frame 22 using an adhesive, together with the upper faces of the projections 33 of the core frame 30.

Both vehicle width direction end portions of the lower main body 47 are integrally formed with the rectangular flat-plate shaped lips 47B that jut out toward the vehicle width direction insides. Lower faces of the main body 32 of the core frame 30 at the sides of the protrusions 34 are joined to upper faces of the lips 47B using an adhesive. Namely, the lips 47B of the lower main body 47 are clamped and fixed between the lower frame 26 and the core frame 30.

As illustrated in FIG. 1 and FIG. 2, the side walls 47C are formed at portions of the lower ductile member 46 further outside in the vehicle width direction than the lips 47B of the lower main body 47. The side walls 47C are formed substantially vertically toward the vehicle upper side, more specifically at a slight incline toward the vehicle upper outsides as viewed along the vehicle front-rear direction (at the same angle as the side walls 28), so as to follow the side walls 28 of the lower frame 26.

The height of the side walls 47C is set at substantially the same height as that of the side walls 28 that are vehicle width direction outside end portions of the lower frame 26. Namely, the side walls 28 of the lower frame 26 extend toward the vehicle upper side as far as a height position almost reaching the boundary 49 between the side walls 47C and the lower flange 48 of the lower main body 47.

The lower flanges 48 projecting out to the vehicle width direction outsides from the upper end portions of the end faces 38 of the core frame 30 and the side walls 28 of the lower frame 26 (the battery frame 20) are integrally provided contiguous to vehicle width direction outside end portions of the side walls 47C. As illustrated in FIG. 2, plural holes 48B, through which the flange bolts 58 (described later), serving as fasteners, are inserted, are formed through the lower flanges 48 at specific intervals along the vehicle front-rear direction.

More specifically, similarly to the upper flanges 44, respective substantially rectangular shaped indented shapes are formed between the respective holes 48B of the lower flanges 48 (configuring indentations 48E), such that plural (for example five) regions centered on the respective holes 48B form substantially rectangular, relative projection shapes (substantially hat shaped cross-section profiles projecting toward the vehicle upper side). Each of these regions (projections) respectively serves as a fastening portion 48C.

Figure 6:
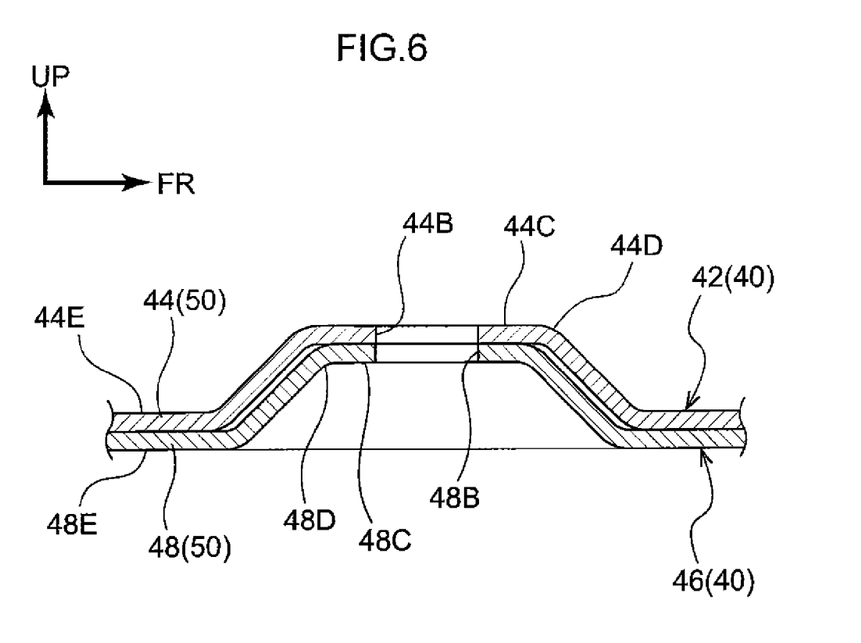
FIG. 6 is an enlarged cross-sectional view illustrating a fastening portion of the ductile member included in the vehicle battery mounting structure according to the present exemplary embodiment.

The configuration of ridge lines 48D on the vehicle front-rear direction sides of the respective fastening portions 48C is similar to that of the ridge lines 44D of the respective fastening portions 44C of the upper flanges 44. Therefore, as illustrated in FIG. 1 and FIG. 6, the upper flanges 44 and the lower flanges 48 protruding out from the battery frame 20 toward the vehicle width direction outsides can be overlaid while being mutually positioned with respect to each other. The upper flanges 44 and the lower flanges 48 are joined together using an adhesive (or using rivets or the like).

Namely, the mutually overlaid and joined upper flanges 44 and lower flanges 48 form flanges 50 serving as locations on the battery frame 20 side for fixing to the under members 14 (the lower face side of the floor panel 12). The holes 44B and the holes 48B are in communication with each other, as illustrated in FIG. 6.

The battery frame 20 is accordingly fastened and fixed to the under members 14 through the ductile member 40 (the flanges 50) by inserting the flange bolts 58 through the holes 48B, 44B and the through holes 14A from the vehicle lower side, and screwing into the weld nuts 52. Note that the ductile member 40 (the upper ductile members 42 and the lower ductile member 46) are made from metal, and are, for example, formed from high tensile steel plates, or extra-high tensile steel plates.

As illustrated in FIG. 1 and FIG. 2, inclined portions 44A are formed at the upper main body 43 sides of the upper flanges 44, and extend from the vehicle width direction upper outside toward the vehicle width direction lower inside (toward boundaries 45 between the upper main bodies 43 and the upper flanges 44) at the vehicle width direction outsides of the battery frame 20. Forming the inclined portions 44A achieve a configuration in which the boundaries 45 act as the pivot points for bending deformation of the flanges 50, as described later.

Inclined portions 48A are also formed on the lower main body 47 sides of the lower flanges 48 that are overlaid with and joined to the upper flanges 44, at the vehicle width direction outsides of the battery frame 20. The inclined portions 48A extend from the vehicle width direction upper outside toward the vehicle width direction lower inside (toward boundaries 49 between the lower main body 47 and the lower flanges 48), at the same angle as the inclined portions 44A. A configuration is accordingly achieved in which the boundaries 49, together with the boundaries 45, serve as pivot points for bending deformation of the flanges 50.

As illustrated in FIG. 1, vehicle width direction outside end portions of the floor panel 12 are formed as bent portions 12A that are bent toward the vehicle upper side. Each bent portion 12A is joined to an inner panel 62 of a metal rocker 60 by welding or the like. The rockers 60 include the inner panel 62, formed into a substantially hat shaped cross-section profile, and an outer panel 64, formed into a substantially hat shaped cross-section profile.

Namely, in each of the rockers 60, an upper flange 64A of the outer panel 64 is joined to an upper flange 62A of the inner panel 62 by welding or the like, and a lower flange 64B of the outer panel 64 is joined to a lower flange 62B of the inner panel 62 by welding or the like, thereby forming a rectangular closed cross-section profile.

Metal energy absorption members 70 are disposed between vehicle lower sides of the rockers 60 (including both vehicle width direction end portions of the floor panel 12) and the battery frame 20. Each energy absorption member 70 includes an inner member 72 disposed inside in the vehicle width direction in close proximity to the side wall 28, and an outer member 76 disposed outside in the vehicle width direction of the inner member 72 across a specific gap (a sufficient gap to allow insertion of the lower flanges 62B, 64B).

The inner member 72 is formed in a shape integrally combining plural (for example, seven) blocks with closed substantially rectangular shaped cross-section profiles (tube shapes) extending along the vehicle front-rear direction. A side wall 73A facing toward the vehicle width direction inside of a vehicle width direction innermost block 73 is disposed in close proximity to the side wall 28.

More specifically, the side wall 73A of the block 73 is formed with a slight incline toward the vehicle upper outside (at the same inclination angle as the side walls 28), so as to be substantially parallel to the side wall 28 as viewed along the vehicle front-rear direction (as viewed from the front), and is disposed facing the side wall 28 across a small gap in the vehicle width direction. The upper end face 73B of the side wall 73A and the upper end face 28A of the side wall 28 are positioned at substantially the same height as each other.

Note that, the block 73 is fastened and fixed to the under member 14 at a portion excluding a fastening location of the flanges 50, using bolts and weld nuts, not illustrated in the drawings. At the vehicle width direction outermost side of each of the inner members 72, an upper side block 74 is fastened and fixed to the inner panel 62 of the rockers 60 using bolts 66 and weld nuts 68. The inner members 72 are thus disposed at the vehicle lower sides of both vehicle width direction end portions of the floor panel 12.

The outer member 76 is formed in a shape integrally combining plural (for example, five) blocks with closed substantially rectangular cross-section profiles (or tube shapes) extending along the vehicle front-rear direction. At the vehicle width direction outermost side of each of the outer members 76, an upper side block 79 is fastened and fixed to the outer panel 64 of the rocker 60 using bolts 66 and weld nuts 68. The outer members 76 are thus disposed at the vehicle lower sides of the rockers 60.

At the vehicle width direction outermost of the inner member 72, a projection 75A is formed on a lower side block 75 so as to protrude out toward the vehicle width direction outside. An indentation 77A indented toward the vehicle width direction outside is formed at a boundary between the vehicle width direction inside lower side blocks block 77 and a block 78 of the outer member 76, so as to accommodate the projection 75A (without contacting the projection 75A).

The indentation 77A is formed so as to fit together with (contact) the projection 75A when the outer member 76 has moved toward the inner member 72 side in a vehicle side collision, thereby enabling a portion of input collision load to be efficiently transmitted from the outer member 76 to the inner member 72. Namely, the outer member 76 and the inner member 72 are capable becoming a single unit and undergoing plastic deformation (being crushed) toward the vehicle width direction inside.

Explanation follows regarding operation of the vehicle battery mounting structure 10 configured as described above. Namely, explanation follows regarding operation in a case in which, for example, the vehicle is involved in a side collision with a circular columnar shaped (or circular cylinder shaped) metal pole P (obstacle) extending in a vertical direction, as illustrated in FIG. 7.

Figure 7:
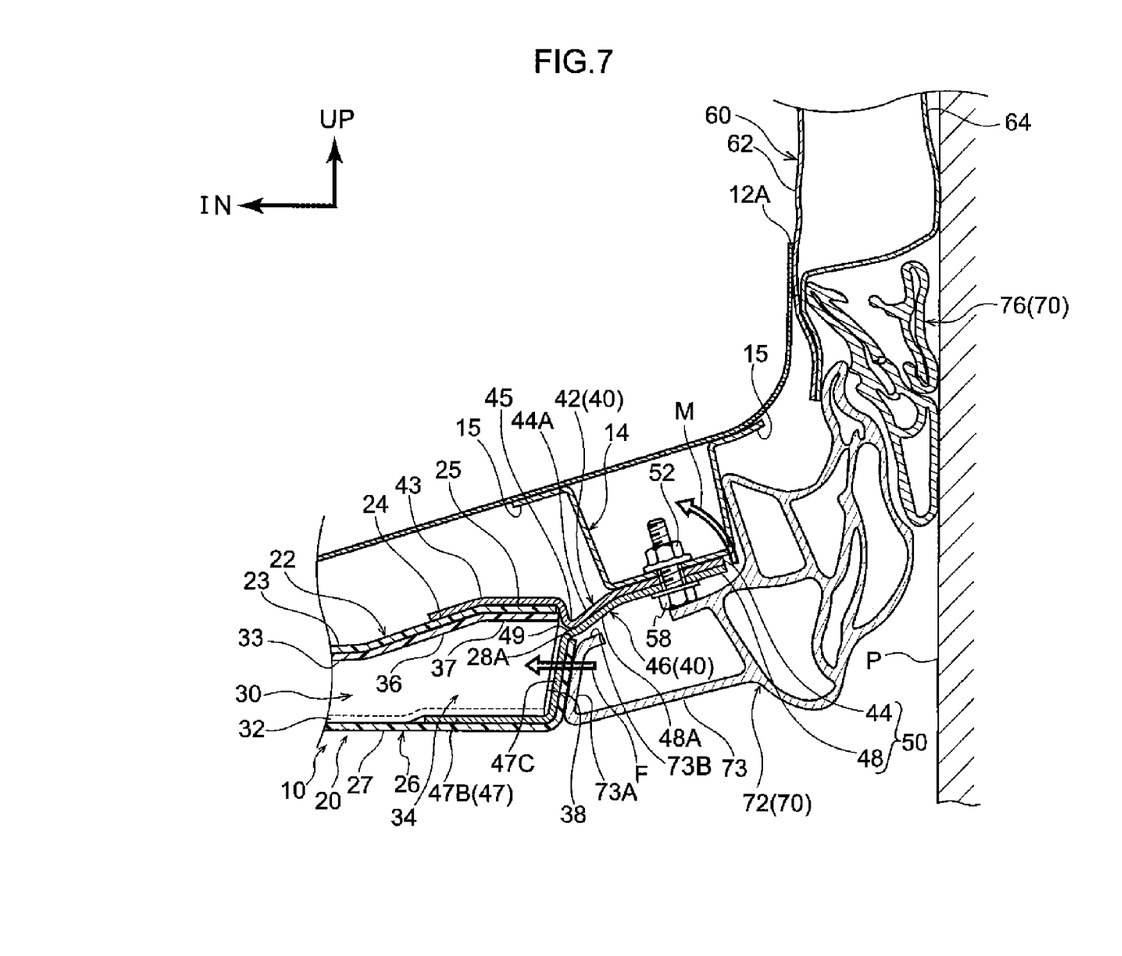
FIG. 7 is a front cross-sectional view illustrating a state in which a vehicle provided with the vehicle battery mounting structure according to the present exemplary embodiment has been involved in a side collision with a pole.

As illustrated in FIG. 7, in the event that the vehicle is involved in a side collision with the pole P, excessive collision load toward the vehicle width direction inside is input to the rocker 60 and the energy absorption member 70. When collision load is input from the vehicle width direction outside, the rocker 60 moves as it undergoes plastic deformation toward the vehicle width direction inside, thereby absorbing a portion of the input collision load. The remaining portion of the collision load is transmitted to the floor panel 12.

When collision load is transmitted to the floor panel 12, the vehicle width direction outside end portion of the floor panel 12 curls up, and a vehicle width direction outside end portion of the under member 14 fixed to the lower face of the floor panel 12 is moved toward the vehicle upper side. When this occurs, a bending moment M with axial direction along the vehicle front-rear direction is input to the flange 50 of the ductile member 40 fastened and fixed to the under member 14.

Namely, the flange 50 of the ductile member 40 fastened and fixed to the under members 14 is imparted with a force to bend the flange 50 (upper flange 44 and lower flange 48) upward about the boundary 45 between the upper main body 43 and the upper flange 44 (i.e., to move the vehicle width direction outside end portion of the flange 50 toward the vehicle upper side).

Note that the flange 50 (ductile member 40) is ductile due to being made from metal (high tensile steel plates, or extra-high tensile steel plates). Moreover, the inclined portions 44A, 48A, extending from the vehicle width direction upper outside toward the vehicle width direction lower inside, are formed at the upper main body 43 side of the upper flange 44 and at the lower main body 47 side of the lower flange 48 that form the flange 50, and at the vehicle width direction outside than the battery frame 20. Moreover, the upper flanges 44 and the lower flanges 48 are joined together using an adhesive.

Accordingly, the flange 50 readily undergoes bending deformation toward the vehicle upper side about the boundaries 45, 49. The bending moment M input to the flange 50 is thereby efficiently absorbed by the bending deformation of the flange 50 toward the vehicle upper side, suppressing or preventing transmission of the bending moment M to the battery frame 20. Namely, in the event of a side collision of the vehicle, stress load imparted to the battery frame 20 from the under member 14 through the flange 50 can be reduced or eliminated.

Due to its ductility, the flange 50 merely undergoes bending deformation toward the vehicle upper side, and is not at risk of breaking (i.e., breakage of the flange 50 is suppressed or prevented). There is accordingly no concern of the battery frame 20 separating from the under member 14, and no concern of the fuel cell stack 16 falling from the vehicle.

When collision load is input to the energy absorption member 70 (the outer member 76 and the inner member 72) from the vehicle width direction outside, the energy absorption member 70 moves as it undergoes plastic deformation toward the vehicle width direction inside, thereby absorbing a portion of the input collision load. The remaining portion of the collision load is transmitted to the under member 14 and the battery frame 20.

The collision load transmitted to the under member 14 is transmitted to the flange 50 (the upper flange 44 and the lower flange 48) through the flange bolts 58. Note that in plan view, the ridge lines 44D at the fastening portions 44C of the upper flange 44 are formed with straight line shapes from the vehicle width direction outside end portions toward the vehicle width direction inside, and are then formed with curved shapes curving in a circular arc shape gradually turning away from the holes 44B on progression toward the vehicle width direction inside (or a bent shape changing direction incrementally at the angled portions 44G).

More specifically, vehicle width direction inside end portions of the curved shapes of the ridge lines 44D of the respective fastening portions 44C extend in the vehicle front-rear direction in plan view, and adjacent ridge lines 44D are mutually connected together. Moreover, the curved shapes of the ridge lines 44D of the respective fastening portions 44C are formed at a position intersecting with the hypothetical tangent K1 to the vehicle width direction inside edges of the holes 44B in plan view.

Moreover, in plan view the vehicle width direction outside end portions 44F of the curved shapes of the ridge lines 44D of the respective fastening portions 44C are formed further to the vehicle width direction inside than the hypothetical tangent K2 to the vehicle width direction outside edges of the holes 44B, and more specifically, are formed further to the vehicle width direction inside than the hypothetical straight line K3 running along the vehicle front-rear direction to pass through the centers O of the holes 44B. The lower flange 48 is likewise formed similarly to the upper flange 44.

Surface rigidity of the respective fastening portions 44C of the upper flange 44 and the respective fastening portions 48C of the lower flanges 48 is accordingly secured or increased. A collision load Fd input from the flange bolts 58 to the respective fastening portions 44C of the upper flange 44 and the respective fastening portions 48C of the lower flange 48 is efficiently distributed in the vehicle front-rear direction, following the respective ridge lines 44D and the respective ridge lines 48D, as illustrated in FIG. 4 and FIG. 5 (i.e., localized input of collision load to the vehicle width direction inside edges of the holes 44B, 48B is reduced).

Accordingly damage to, or breakage of, the flange 50 can be suppressed or prevented even when collision load is input to the upper flange 44 and the lower flange 48, namely to the flange 50, through the flange bolts 58. The flange 50 thus undergoes bending deformation toward the vehicle upper side about the boundaries 45, 49 even more efficiently, and the bending moment M input to the flange 50 is even more efficiently absorbed by the bending deformation. Namely, transmission of the bending moment M to the battery frame 20 is further suppressed or prevented.

The side wall 73A of the energy absorption member 70 is formed with a slight incline toward the vehicle upper outside, so as to be substantially parallel to the side wall 28 of the battery frame 20 as viewed from the front, and is disposed facing the side wall 28 across a gap. The height position of the upper end face 73B of the side wall 73A is substantially the same as the height position of the upper end face 28A of the side wall 28.

Accordingly, when the energy absorption member 70 moves toward the vehicle width direction inside, the side wall 73A makes efficient surface contact with (i.e., pressing contact with the entire face of) the side wall 28, suppressing or preventing localized input of collision load to the side wall 28 (the battery frame 20). The side wall 28 is accordingly suppressed or prevented from cracking or breaking, suppressing or preventing the occurrence of cross-sectional collapse of the battery frame 20.

Even when the energy absorption member 70 moves further toward the vehicle width direction inside and the side wall 73A presses the side wall 28 while turning due to the bending moment M, a collision load F input thereby is efficiently transmitted toward the vehicle width direction inside. Namely, a portion of the collision load heading toward the vehicle width direction inside input in a vehicle side collision is efficiently transmitted from the side wall 28 to the end face 38 of the core frame 30, namely to the row of plural projections 33, and is efficiently absorbed by the row of plural projections 33. Input of collision load to the fuel cell stack 16 can accordingly be suppressed or prevented.

Note that the lips 47B of the lower main body 47 of the lower ductile member 46 are clamped and fixed between the core frame 30 (main body 32) and the lower frame 26 (bottom plate 27). In the event of a side collision of the vehicle, the lips 47B of the lower main body 47 are accordingly suppressed or prevented from separating from the core frame 30 and the lower frame 26, even when the flanges 50 undergo bending deformation toward the vehicle upper side.

As illustrated in FIG. 7, force toward the vehicle upper side is imparted to the vehicle width direction outside end portion of the upper flange 44 when the flange 50 undergoes bending deformation toward the vehicle upper side, thereby imparting a (pressing) force to the upper main body 43 toward the side of the inclined wall 24. Namely, in the event of a side collision of the vehicle, force in a direction to separate the upper main body 43 from the inclined wall 24 is not readily imparted to the upper main body 43. Separation of the upper main body 43 from the inclined wall 24 is accordingly suppressed or prevented.

An indentation (not illustrated in the drawings) may be formed at the upper main body 43 side of the upper flange 44 at the vehicle width direction outside of the battery frame 20, namely at the boundary 45 between the upper main body 43 and the upper flange 44. The indentation may be a substantially U-shape (a substantially circular arc shape when viewing the boundary 45 in cross-section) or a substantially V-shape as viewed along the vehicle front-rear direction.

The vehicle width direction outside end portions of the flanges 50 thereby undergo bending deformation toward the vehicle upper side more readily about the boundaries 45 between the upper main bodies 43 and the upper flanges 44, namely about the indentation. Stress load imparted to the battery frame 20 from the under member 14 through the flange 50 can accordingly be reduced or eliminated.

Explanation has been given above regarding the vehicle battery mounting structure 10 according to the present exemplary embodiment based on the drawings; however, the vehicle battery mounting structure 10 is not limited to the embodiment illustrated in the drawings, and the design may be modified as appropriate within a range not departing from the spirit of the present invention. For example, there is no limitation to forming the ductile member 40 from high tensile steel plates or extra-high tensile steel plates, and the ductile member 40 may, for example, be formed from an aluminum alloy or iron with a sufficient hardness.

The flanges 50 of the ductile member 40 are not limited to a configuration fastened and fixed to the under members 14 that are joined and fixed to the lower face of the floor panel 12 and, for example, may be fastened and fixed to brackets, not illustrated in the drawings, that are joined and fixed to the lower face of the floor panel 12 or to lower faces of the under members 14.

Namely, the flanges 50 of the ductile member 40 may be indirectly joined to the floor panel 12 or the under members 14. The "fastening" in the present exemplary embodiment is not limited to fastening using nuts and bolts, and fastening (attachment) may be performed using other fasteners (not illustrated in the drawings).

Moreover, there is no limitation to joining the upper main bodies 43 and the lower main body 47 of the ductile member 40 to the battery frame 20 with adhesive, and they may be joined using a joining means such as rivets or the like.

The battery frame 20 of the present exemplary embodiment is not limited to supporting the fuel cell stack 16. For example, the battery frame 20 may also support auxiliary equipment to the fuel cell stack 16 (in addition to the fuel cell stack 16). The fuel cell stack 16 of the present exemplary embodiment may be configured by a secondary battery.

What is claimed is:
1. A vehicle battery mounting structure comprising:
 a battery frame that is disposed at a vehicle lower side of a floor panel, supports a battery, and is made from resin;
 a ductile member that comprises a main body joined to the battery frame and a flange contiguously formed at a vehicle width direction outside end portion of the main body, the flange having a hole, and the ductile member being fastened and fixed to a lower face of the floor panel by a fastener inserted through the hole of the flange; and a fastening portion that is formed in a region including the hole of the flange, the region having a substantially hat shaped cross-section profile projecting toward a vehicle upper side from recessed portions and the region having ridge lines adjacent to the hole and between the fastening portion and the recessed portions at both vehicle front-rear direction sides of the hole, the ridge lines extending along a vehicle width direction and having a curved or bent shape at vehicle width direction inner sides thereof, the ridge lines bending toward directions heading away from the hole adjacent to the ridge lines in plan view.

2. The vehicle battery mounting structure of claim 1, wherein when a tangent is set to a vehicle width direction outside edge of the hole in plan view, a vehicle width direction outside end portion of the curved or bent shape of the ridge lines of the fastening portion is formed further inside in the vehicle width direction than the tangent.

3. The vehicle battery mounting structure of claim 1, wherein when a straight line is set that extends in a vehicle front-rear direction and passes through a center of the hole in plan view, a vehicle width direction outside end portion of the curved or bent shape of the ridge lines of the fastening portion is formed further inside in the vehicle width direction than the straight line.

4. The vehicle battery mounting structure of claim 1, wherein the ridge lines bend toward directions heading away from the hole and toward the vehicle front-rear direction in plan view.

5. The vehicle battery mounting structure of claim 1, wherein the ductile member is formed from a high tensile steel plate or an extra-high tensile steel plate.

6. The vehicle battery mounting structure of claim 1, wherein the ductile member further comprises an inclined portion that extends from a vehicle width direction upper outside toward a vehicle width direction lower inside, the inclined portion being formed at a main body side of the ductile member and at a vehicle width direction outside of the battery frame.

7. The vehicle battery mounting structure of claim 1, wherein the fastening portion comprises at least a first fastening portion and a second fastening portion that are adjacent in a vehicle front-rear direction, and one of the ridge lines of the first fastening portion is mutually connected to one of the ridge lines of the second fastening portion.

8. The vehicle battery mounting structure of claim 1, wherein when a tangent is set to a vehicle width direction inside edge of the hole along a vehicle front-rear direction in plan view, the curved or bent shape of the ridge lines of the fastening portion is formed at a position intersecting with the tangent, the vehicle front-rear direction being perpendicular to the vehicle width direction.

* * * * *